United States Patent
Lee

(10) Patent No.: US 12,491,960 B2
(45) Date of Patent: Dec. 9, 2025

(54) BICYCLE ROTATION LIMITING STRUCTURE

(71) Applicant: GLORY WHEEL ENTERPRISE CO., LTD., Taichung (TW)

(72) Inventor: Chien-Hao Lee, Taichung (TW)

(73) Assignee: GLORY WHEEL ENTERPRISE CO., LTD., Taichung (TW)

( * ) Notice: Subject to any disclaimer, the term of this patent is extended or adjusted under 35 U.S.C. 154(b) by 475 days.

(21) Appl. No.: 18/080,258

(22) Filed: Dec. 13, 2022

(65) Prior Publication Data
US 2024/0002009 A1 Jan. 4, 2024

(30) Foreign Application Priority Data
Jun. 29, 2022 (TW) .................................. 111206910

(51) Int. Cl.
*B62K 21/02* (2006.01)
*B62K 3/02* (2006.01)
*B62K 19/32* (2006.01)

(52) U.S. Cl.
CPC .............. *B62K 19/32* (2013.01); *B62K 21/02* (2013.01); *B62K 3/02* (2013.01)

(58) Field of Classification Search
CPC ........... B60K 17/32; B60K 21/02; B60K 3/02
USPC ....................................................... 280/279
See application file for complete search history.

(56) References Cited

U.S. PATENT DOCUMENTS

| | | | | |
|---|---|---|---|---|
| 5,918,895 A | * | 7/1999 | Chi ........................ | B62K 21/06 280/279 |
| 5,964,474 A | * | 10/1999 | Chen ..................... | B62K 21/18 280/279 |
| 6,302,589 B1 | * | 10/2001 | Van Houtte ............ | B62K 21/06 280/279 |
| 6,416,071 B2 | * | 7/2002 | Marui .................... | B62K 21/06 280/279 |
| 6,736,543 B2 | * | 5/2004 | Couturet ................ | B62K 21/06 280/279 |
| 8,302,981 B1 | * | 11/2012 | Ma ........................ | B62K 21/06 280/279 |
| 8,662,517 B2 | * | 3/2014 | King ...................... | F16C 25/06 280/270 |
| 9,615,472 B1 | * | 4/2017 | Calfee .................... | B62J 11/19 |
| 10,883,481 B2 | * | 1/2021 | Staples .................. | B62K 19/32 |

(Continued)

FOREIGN PATENT DOCUMENTS

| CN | 2463298 Y | 12/2001 |
|---|---|---|
| CN | 2606049 Y | 3/2004 |

(Continued)

*Primary Examiner* — Hau V Phan
(74) *Attorney, Agent, or Firm* — Best & Flanagan LLP

(57) ABSTRACT

A bicycle rotation limiting structure is placed in the lower part of a head tube, and a fork tube is mounted through the bicycle rotation limiting structure and the head tube. The bicycle rotation limiting structure includes a lower headset cup and a rotating member, a positioning set, a joining set, and at least one limiting set installed inside the lower headset cup. The limiting set includes a limiting groove positioned at the inner rim of the lower headset cup, and a limiting tongue positioned at the outer rim of the outer seat. The joining set includes a first joining member positioned at the outer seat and a second joining member positioned at the fork tube.

19 Claims, 16 Drawing Sheets

(56) References Cited

U.S. PATENT DOCUMENTS

| | | | | |
|---|---|---|---|---|
| 2013/0319169 A1* | 12/2013 | Savard | ................... | B62K 21/18 |
| | | | | 74/551.8 |
| 2021/0294849 A1* | 9/2021 | Talbot | ................. | G06F 3/04842 |
| 2021/0362798 A1* | 11/2021 | Robinson | ............... | B62K 21/06 |
| 2022/0047912 A1* | 2/2022 | McAllister | ......... | A63B 22/0046 |

FOREIGN PATENT DOCUMENTS

| | | |
|---|---|---|
| CN | 2608404 Y | 3/2004 |
| GB | 2368826 A | 5/2002 |
| TW | 503883 U | 9/2002 |
| TW | 554879 U | 9/2003 |
| TW | I460095 B | 11/2014 |
| TW | M584287 U | 10/2019 |

\* cited by examiner

BICYCLE ROTATION LIMITING STRUCTURE

FIELD OF INVENTION

The present invention provides a rotation limiting structure, especially a bicycle rotation limiting structure to prevent over-rotation of a bicycle while riding.

BACKGROUND OF THE INVENTION

The steering mechanism of a bicycle mainly involves in the rotation of a handlebar coupled with a fork tube and a front wheel to control direction of the bicycle. Structurally, the middle of the handlebar is connected with the top of the fork tube with a stem, the top of the fork tube is mounted through a head tube of a frame, and the two fork tube ends are connected with the central axis of a front wheel.

To keep a rider in balance, the frame is needed to maintain a forward orientation when the fork tube and the front wheel rotate synchronously. Therefore, the fork tube and the head tube rotate relative to each other. A headset is often placed between the head tube and the fork tube to make the rotation smooth.

To achieve smooth and stable rotation of a bicycle, extensive studies on the components of a headset and detailed mechanisms of the components have been done in the industry-. For example, the structure of head set disclosed in Taiwan patent application number TW 108208505 or the improved structure for steering head joint set disclosed in Taiwan patent application number TW 091216122.

However, a smooth rotation often leads to over-rotation to affect the balance and to pose a danger to the rider. To improve the safety of the rotation, the industry has started to redesign headsets to avoid over-rotation of the handlebar, the fork tube, and the front wheel. For example, the headset structure with veer limiting function disclosed in Taiwan patent application number TW 090206983 or the headset assembly capable of limiting steering angle disclosed in Taiwan patent application number TW 100121514.

Nevertheless, the conventional limiting structures of a bicycle are often one or more limiting grooves located in some part of an upper cup. This design may cause the center of mass of the upper cup not evenly distributed and affect the smoothness of the rotation of the fork tube and the front wheel during a rotation. Furthermore, the offset of the center of mass of the upper cup may reduce the lifespan of the bearing and causes the bearing to wear out. Serious wear of the bearing may even cause the handlebar to shake and cause the ride unsafe. In addition, most of the bicycle limiting structures are set in the upper headset to cause the force of restraint come from the upper part of the fork tube and to cause the sensitivity, the transmission of the force, and the feedback of the force unsatisfactory due to the long distance between the force of restraint to the front wheel. Moreover, the force of restraint from the upper part of the fork tube is also unstable and affects the maneuverability of the handlebar.

It is an object of the present invention to provide a bicycle rotation limiting structure that can solve the problem of the center of mass of the upper cup not evenly distributed and extend the lifespan of the headset.

SUMMARY OF THE INVENTION

In order to improve the aforementioned problems, the present invention provides a bicycle rotation limiting structure placed in the lower part of a head tube, with a fork tube running through the bicycle rotation limiting structure and the head tube. The bicycle rotation limiting structure comprises: a rotating member installed inside a lower headset cup and encircling the outer part of the fork tube; a positioning set installed inside the lower headset cup and encircling the outer part of the fork tube, wherein said positioning set can make the rotating member positioned inside the lower headset cup and rotate, and said positioning set comprises an inner seat and an outer seat; at least one joining set placed between the fork tube and the positioning set, Wherein said joining set anchor the fork tube and the positioning set to provide synchronous and stable rotation; at least one limiting set placed equidistantly between the lower headset cup and the outer seat, wherein the limiting set comprise a limiting groove positioned at the inner rim of the lower headset cup, and a limiting tongue positioned at the outer rim of the outer seat. The limiting groove confines the rotation range of the limiting tongue. The limiting set therefore restricts the synchronous rotation range of the fork tube, the positioning set, and the rotating member. With the joining set located between the positioning set and the middle part of the fork tube and with the limiting set located between the lower headset and the middle part of the fork tube, the force of restraint and the synchronous rotation force are coming from the middle part of the fork tube, and the forces are transmitted to the two ends of the fork tube, shortening the transmission time and improving the maneuverability of rotation. Two or more of the limiting sets surround equidistantly between the lower headset cup and the outer seat, making the center of mass located in the center of the rotation axes during rotation, improving the stability of the rotation, reducing the wear and tear of the bearing thus increasing the lifespan of the bicycle, and enhancing safety of the bicycle.

As above description, the present invention has beneficial effects and advantages as following:

1. The bicycle rotation limiting structure of present invention is placed inside the lower headset, making the force of restraint come from the middle part of the fork tube. The force of restraint is transmitted synchronously to the upper part of the fork tube and lower part of the fork tube, reducing the time of transmission and increasing the agility of the rotation limitation of the handlebar.
2. The bicycle rotation limiting structure of present invention comprises two or more limiting sets surround equidistantly between the lower headset cup and the outer seat, making the center of mass located in the center of the rotation axes during rotation, improving the stability of the rotation and reducing the wobbles of the bicycle d to the offset of the center of mass.
3. The bicycle rotation limiting structure of present invention comprises two or more limiting sets surround equidistantly between the lower headset cup and the outer seat, making the center of mass located in the center of the rotation axes during rotation, reducing the wear and tear of the bearing thus increasing the lifespan of the bicycle and enhancing the safety of the bicycle.
4. The bicycle rotation limiting structure of present invention comprises at least one or more joining set located between the positioning set and the middle part of the fork tube, making the force of restraint and the synchronous rotation force come from the middle-part of the fork tube, enhancing the feedback of the forces and improving the maneuverability of rotation.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
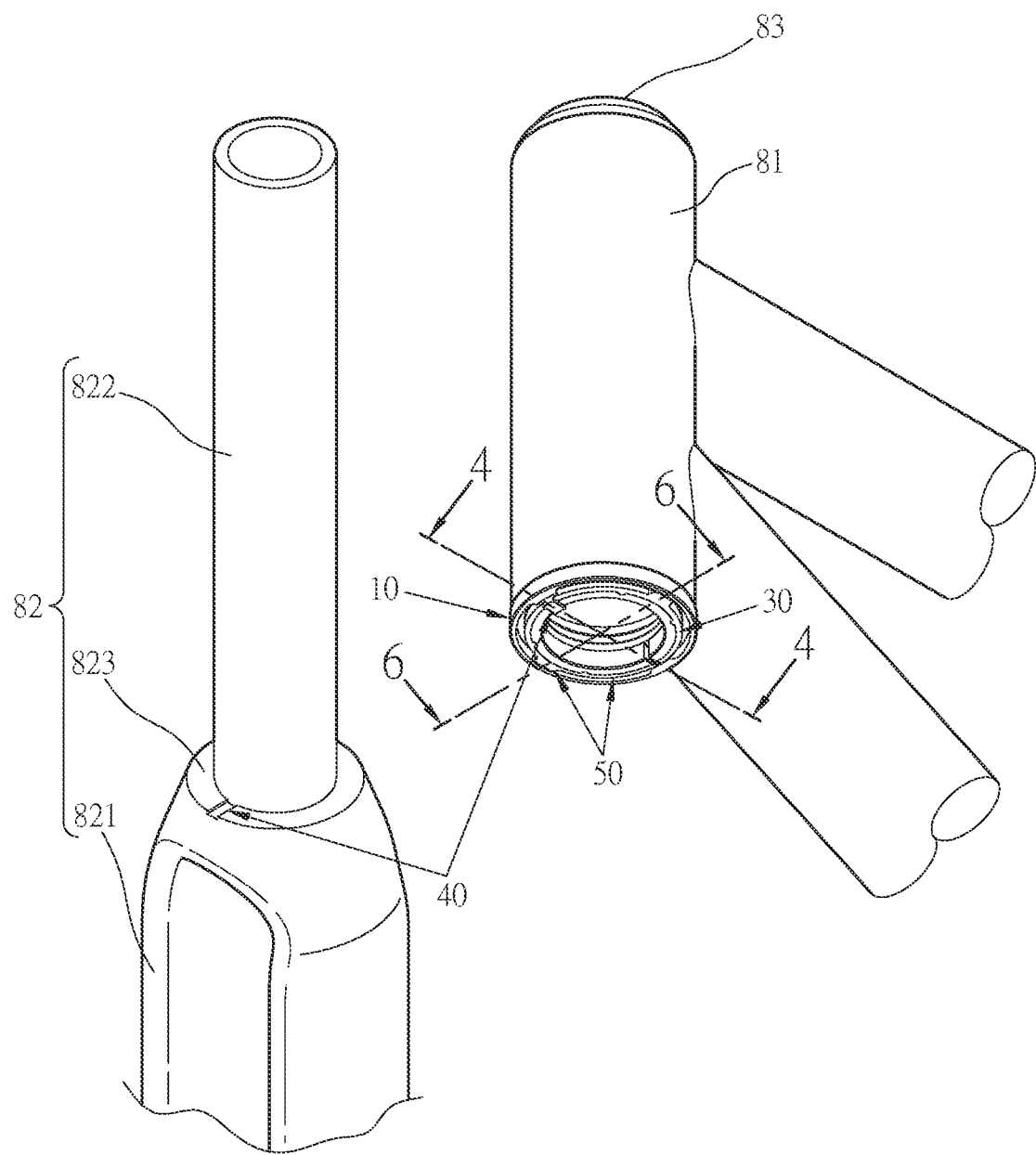
FIG. 1 is an exploded perspective view of a preferred embodiment of a bicycle rotation limiting structure in accordance with the present invention.
Figure 2:
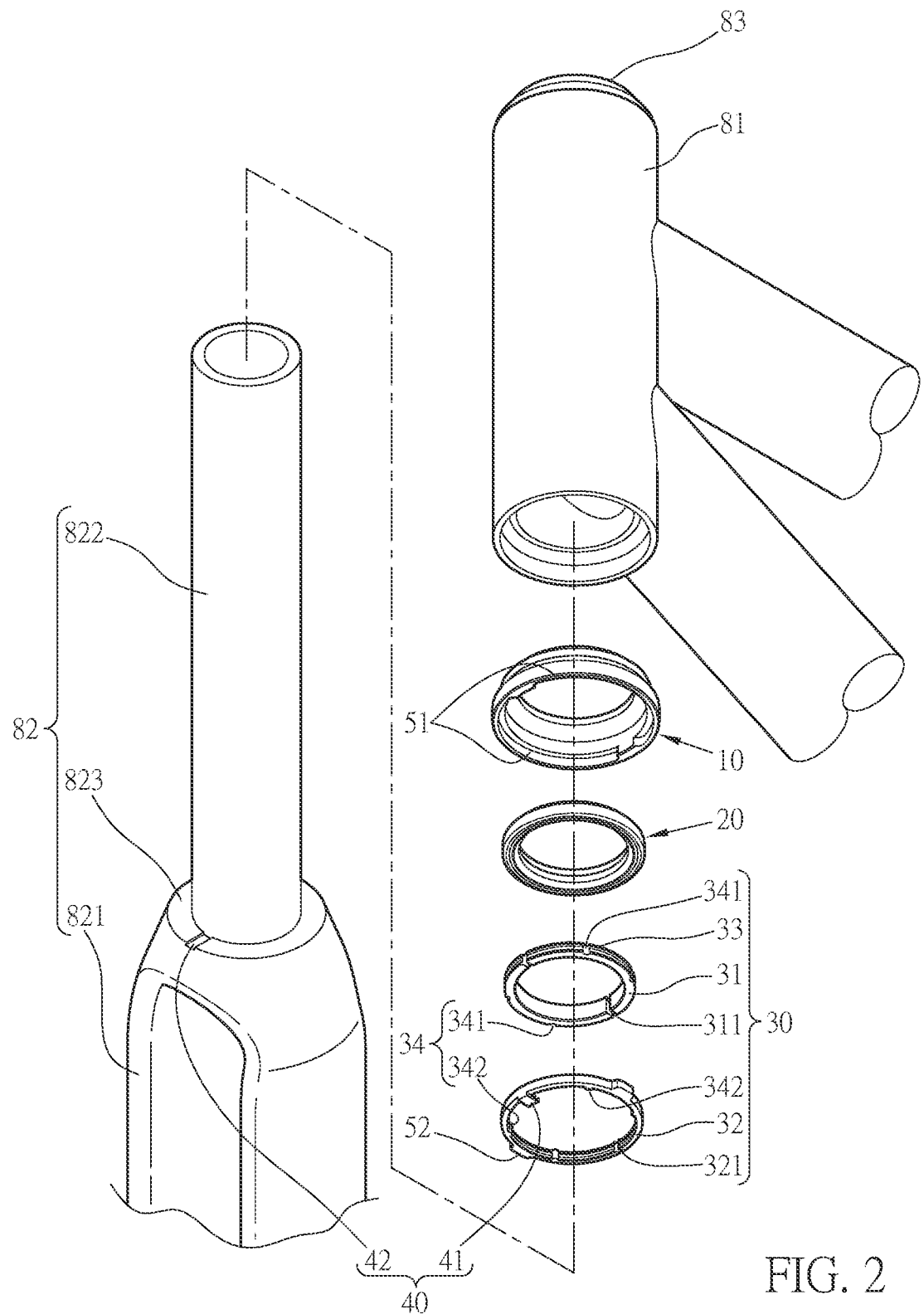
FIG. 2 is another exploded perspective view of the preferred embodiment of the bicycle rotation limiting structure in FIG. 1.
Figure 3:
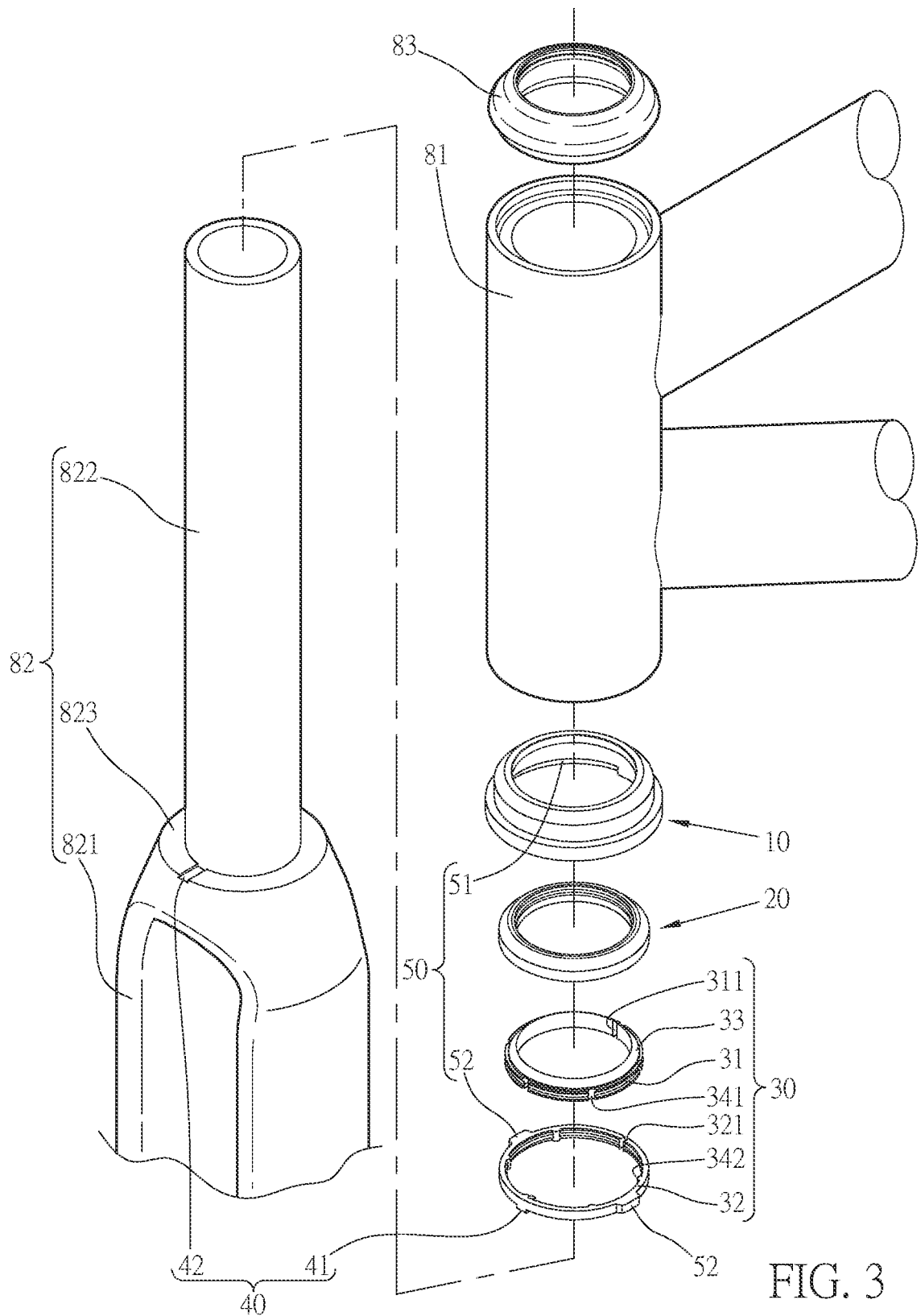
FIG. 3 is a further exploded perspective view of the preferred embodiment of the bicycle rotation limiting structure in FIG. 1.
Figure 4:
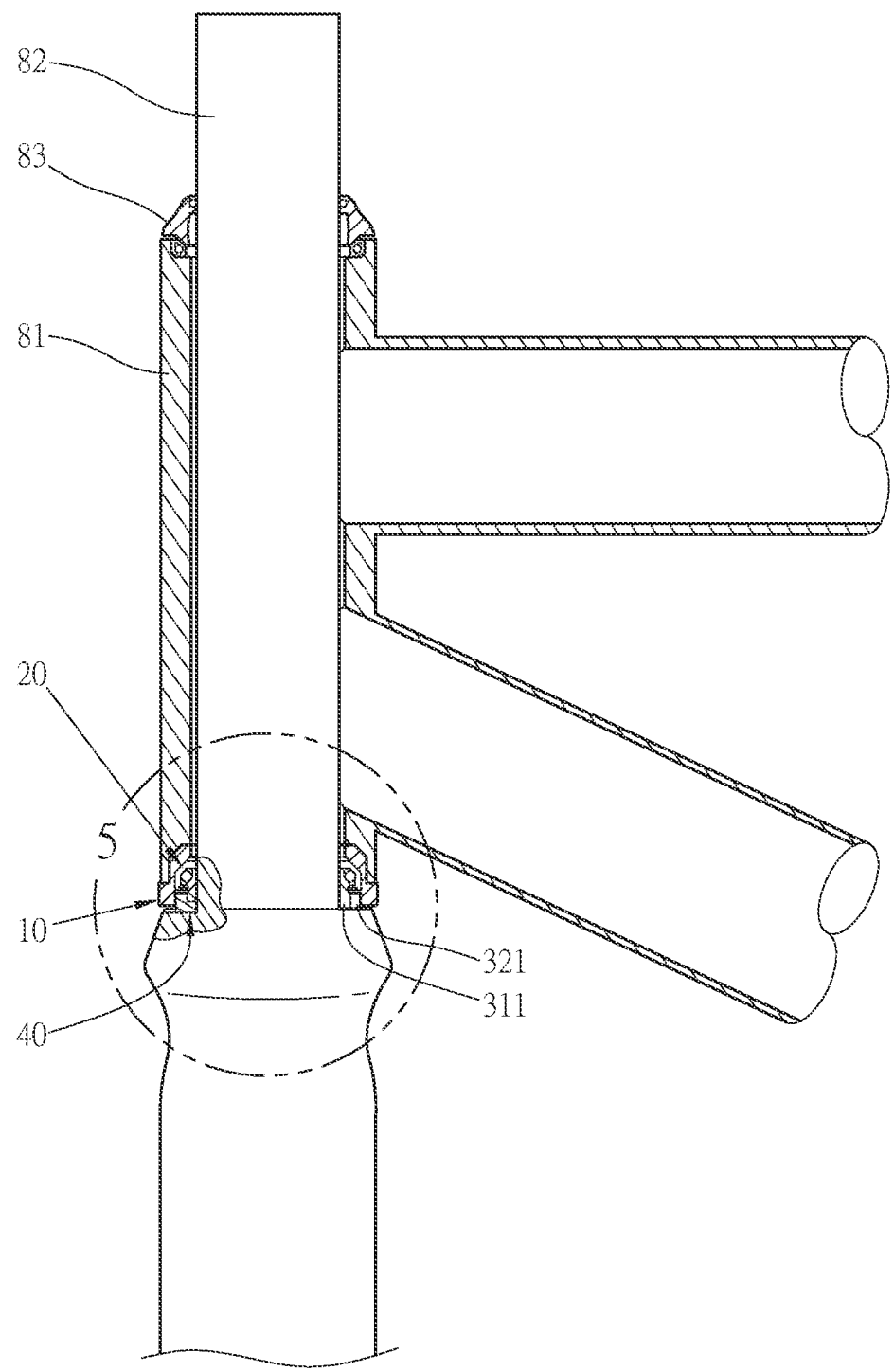
FIG. 4 is a side view in partial section of the preferred embodiment of the bicycle rotation limiting structure in FIG. 1.
Figure 5:
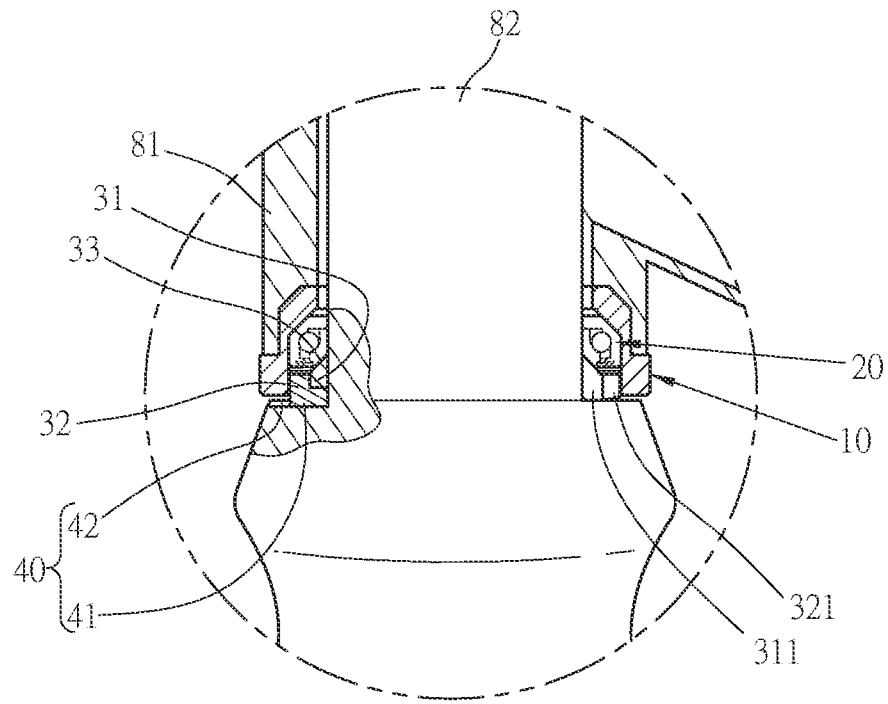
FIG. 5 is an enlarged side view in partial section of the preferred embodiment of the bicycle rotation limiting structure in accordance with the present invention in FIG. 4.
Figure 7:
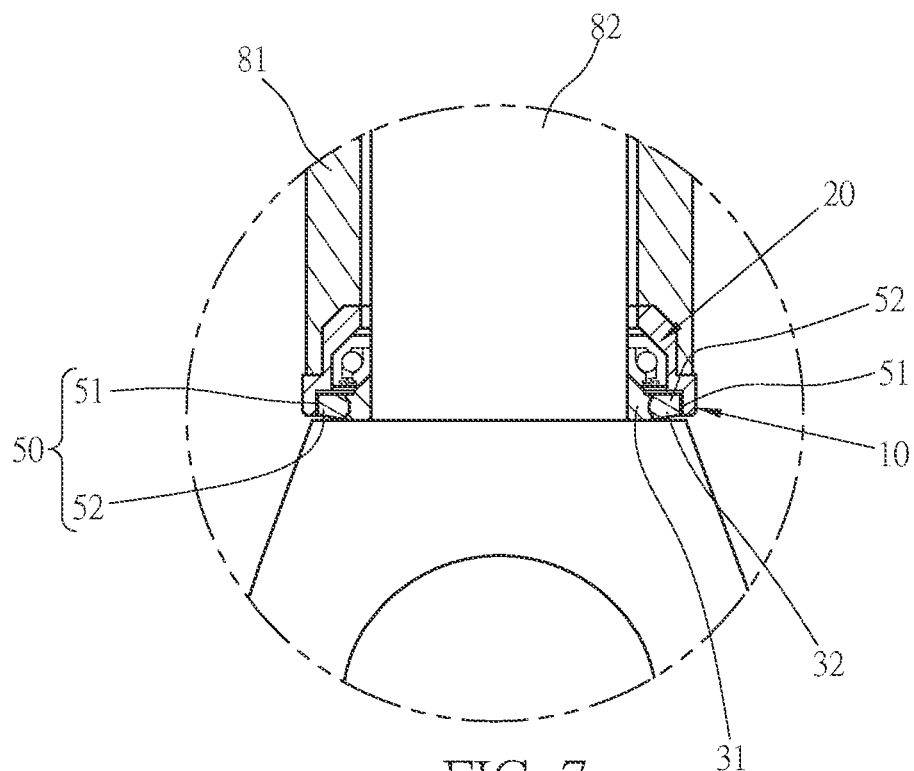
FIG. 7 is an enlarged side view in partial section of the preferred embodiment of the bicycle rotation limiting structure in accordance with the present invention in FIG. 6.
Figure 6:
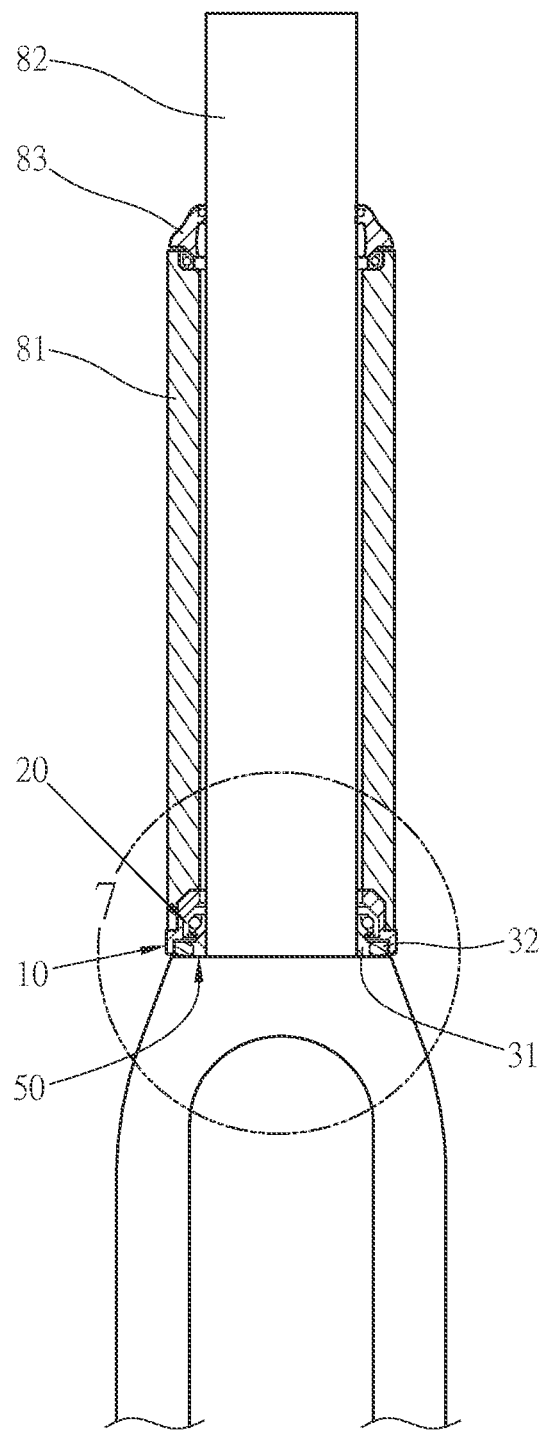
FIG. 6 is a side view in partial section of the preferred embodiment of the bicycle rotation limiting structure in FIG. 1.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIG. 1 to FIG. 7, a preferred embodiment of a bicycle rotation limiting structure is positioned in the lower part of a head tube 81, and the bicycle rotation limiting structure is mounted around a fork tube 82. The bicycle rotation limiting structure comprises a lower headset cup 10 and a rotating member 20, a positioning set 30, a joining set 40, and two limiting set 50 installed inside the lower headset cup 10.

The lower headset cup 10 is placed in the inner wall of the lower part of the head tube 81. An upper headset 83 is placed in the inner wall of the upper part of the head tube 81, and the upper headset 83 is mounted around the fork tube 82. The fork tube 82 comprises a fork crown 821 and a steering tube 822 extending through the center part of the fork crown 821, and a base 823 is mounted on the junction of the fork crown 821 and the steering tube 822.

The rotating member 20 comprises an inner surface and an outer surface, and the lower headset cup 10 is attached to the inner surface of the rotating member 20, and a positioning set 30 is attached to the outer surface of the rotating member 20. The rotating member 20 is placed in the lower headset cup 10 and the rotating member 20 is mounted the fork tube 82. The rotating member 20 and the fork tube 82 can rotate smoothly and synchronously in the head tube 81.

The positioning set 30 is placed in the lower headset cup 10, and the positioning set 30 is mounted around the fork tube 82. The positioning set 30 confines the rotating member 20 to rotate inside the lower headset cup 10. The positioning set 30 comprises an inner seat 31 and an outer seat 32. The inner seat 31 and the outer seat 32 are ring-shaped and coupled together. A contact surface 33 is defined at one side of the inner seat 33 and is in contact with the inner surface of the rotating member 20. The outer part of the outer seat 32 is attached to the inner part of the lower headset cup 10.

An inner split 311 is formed in the inner seat 31 and an outer split 321 is defined in the outer seat 32. At least one snap-fit pair 34 is mounted between the inner seat 31 and the outer seat 32. The snap-fit pair 34 is a pair of interlocking components locks the inner seat 31 and outer seat 32 and makes the inner seat 31 and the outer seat 32 rotate synchronously. The snap-fit pair 34 comprises a slot 341 defined in the outer rim of the inner seat 31 and a protrusion 342 corresponds to the slots 341 and is formed on the inner rim of the outer seat 32.

The joining set 40 is located between the fork tube 82 and the positioning set 30. The joining set 40 combine the fork tube 82 with the positioning set 30 together and makes the fork tube 82 and the positioning set 30 rotate synchronously. The joining set 40 comprises a first joining member 41. The first joining member 41 is a raised area located on the outer seat 32. The joining set 40 also comprises a second joining member 42. The second joining member 42 is an indentation on the base 823 of the fork tube 82, and the second joining member 42 is aligned with the direction of the axis of the fork tube and corresponds to the first joining member 41 in position.

Two limiting sets 50 are located between the lower headset cup 10 and the outer seat 32 and are arranged annularly and equidistantly. Each limiting set 50 comprises a limiting groove 51, wherein the limiting groove 51 is a trench defined in the inner rim of the lower headset cup 10. The limiting set 50 also comprises a limiting tongue 52, wherein the limiting tongue 52 is a protrusion formed on the outer rim of the outer seat 32 and the limiting tongue 52 is confined to rotate within the range of the limiting groove 51. The limiting set 50 can effectively limit the rotation range of the synchronous rotation of the fork tube 82, the positioning set 30, and the rotating member 20 whether the rotation is clockwise or counterclockwise.

With the abovementioned parts and components, the joining set 40 is placed between the positioning set 30 and the middle part of the fork tube 82, and the two limiting sets 50 are place in the lower headset cup 10 near the middle part of the fork tube 82 to make the force of restraint and the synchronous rotation force come from the middle part of the fork tube 82. The forces are transmitted to the two ends of the fork tube 82 to shorten the transmission time and to improve the maneuverability of rotation. Two or more the limiting sets 50 may be arranged annularly and equidistantly between the lower headset cup 10 and the outer seat 32 to make the center of mass located at the center of the rotation axes during rotation, such that the stability of the rotation can be improved to reduce the wear and tear of the bearing, accordingly, the lifespan of the bicycle is prolonged, and safety of the bicycle is enhanced.

To further elaborate the details of the embodiment, the usage of the present invention is described as follows:

The installation of this invention. First, the inner seat 31 is mounted inside the outer seat 32 to make the slots 341 and the protrusions 342 engage with each other mutually. Then, the rotating member 20 and the positioning set 30 are placed inside the lower headset cup 10, The contact surface 33 is in contact with the inner surface of the rotating member 20, and the limiting tongue 52 is held within the limiting groove 51. Then, the steering tube 822 of the fork tube 82 is mounted through the lower headset cup 10, the rotating member 20, the positioning set 30, the head tube 81, and the upper headset 83 sequentially and a cap is installed on the upper headset 83 and fork tube 82 to fasten and finish the installation.

Figure 8:
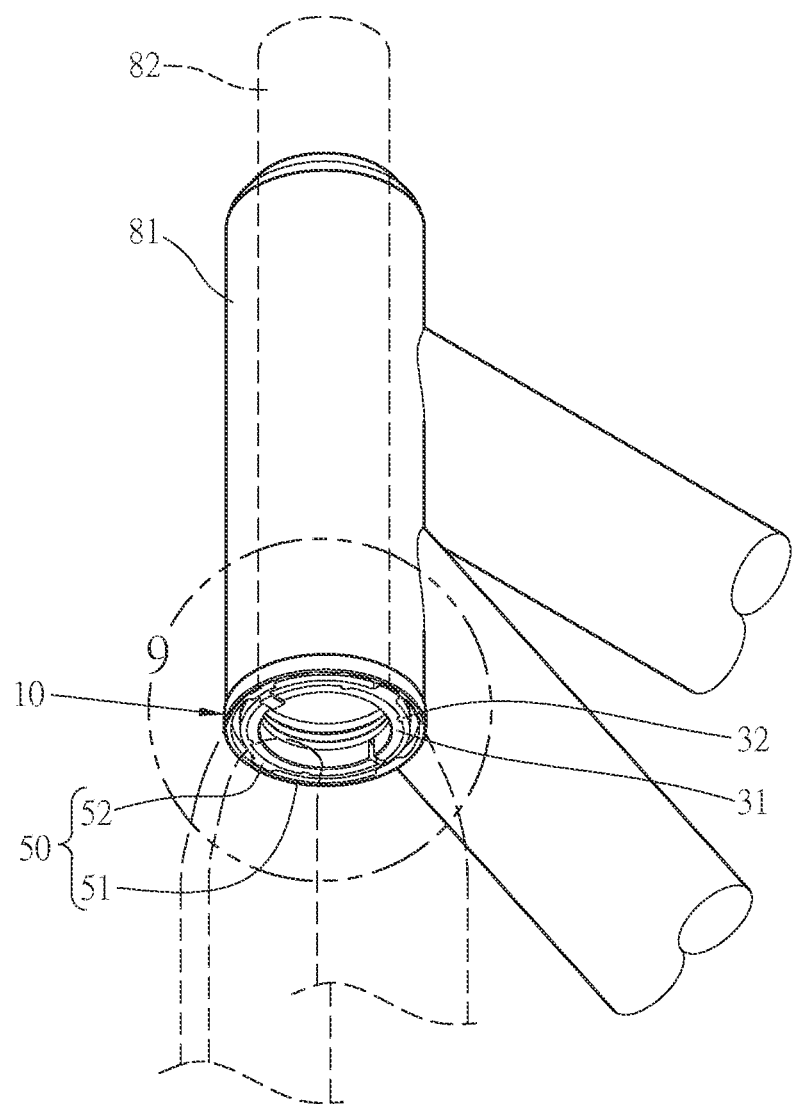
FIG. 8 is an operational perspective view of the preferred embodiment of the bicycle rotation limiting structure in FIG. 1.
Figure 9:
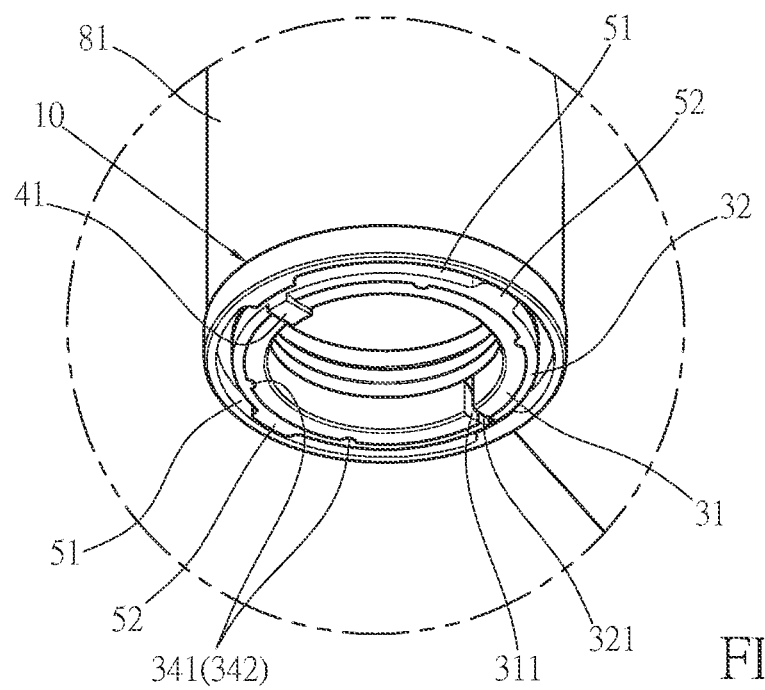
FIG. 9 is an enlarged operational perspective view of the preferred embodiment of the bicycle rotation limiting structure in FIG. 8.
Figure 10:
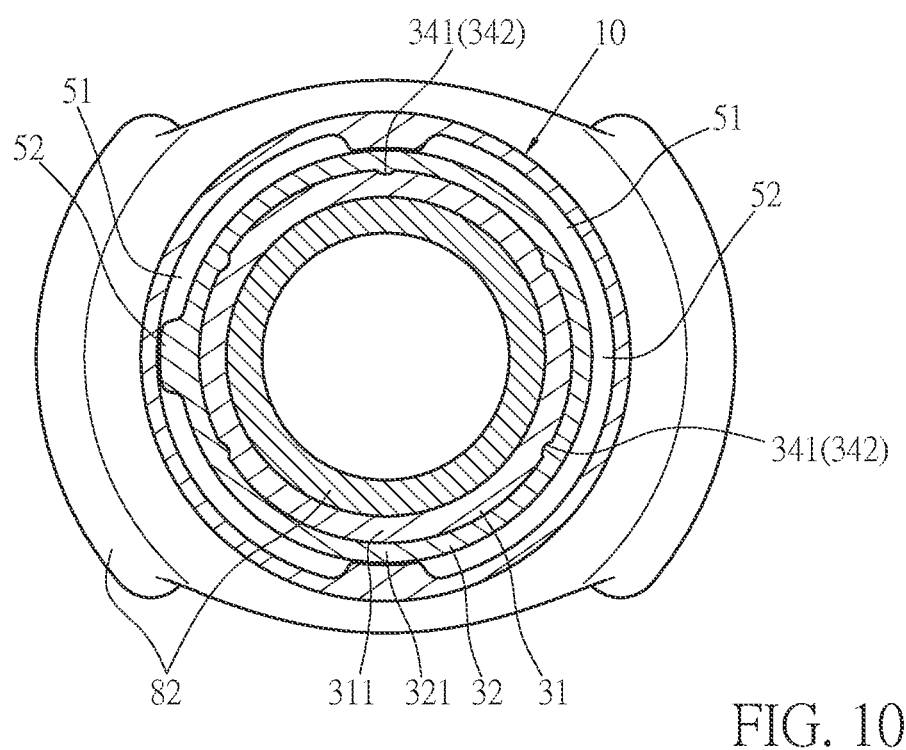
FIG. 10 is an operational cross-sectional bottom view of the preferred embodiment of the bicycle rotation limiting structure in accordance with the present invention in FIG. 8.
Figure 11:
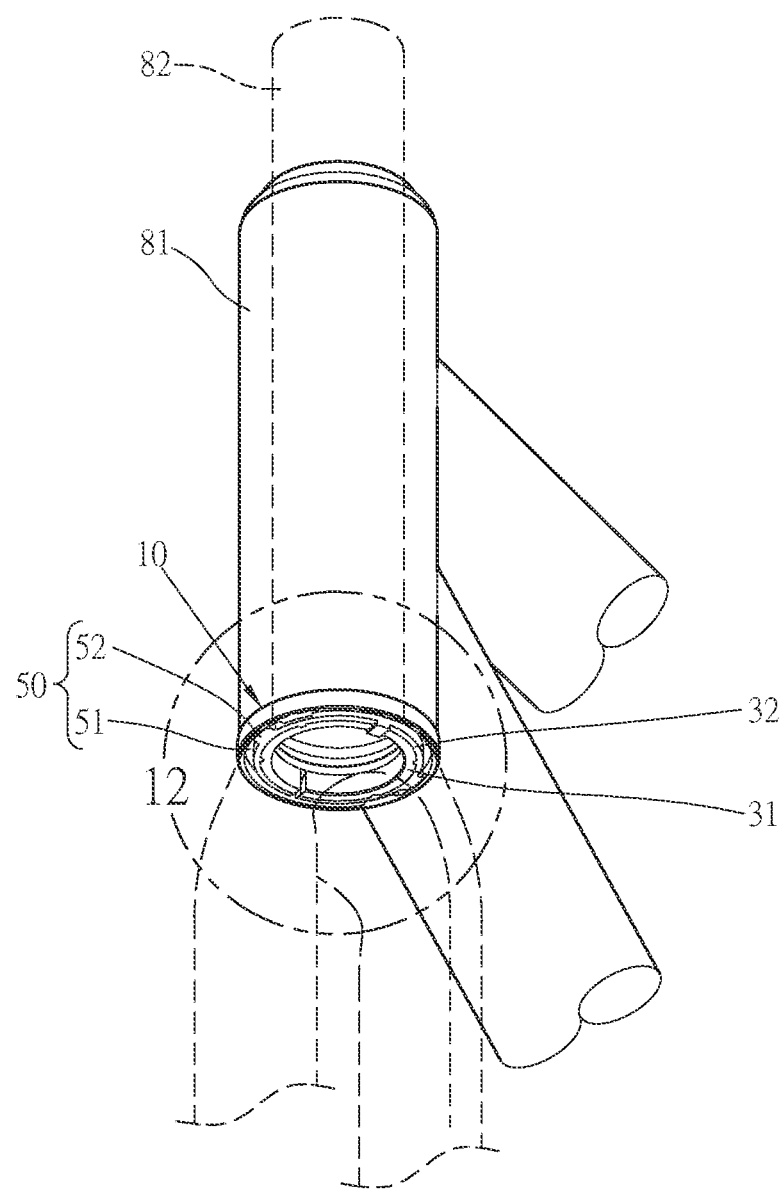
FIG. 11 is another operational perspective view of the preferred embodiment of the bicycle rotation limiting structure in FIG. 1 showing the handlebar being turned left.
Figure 12:
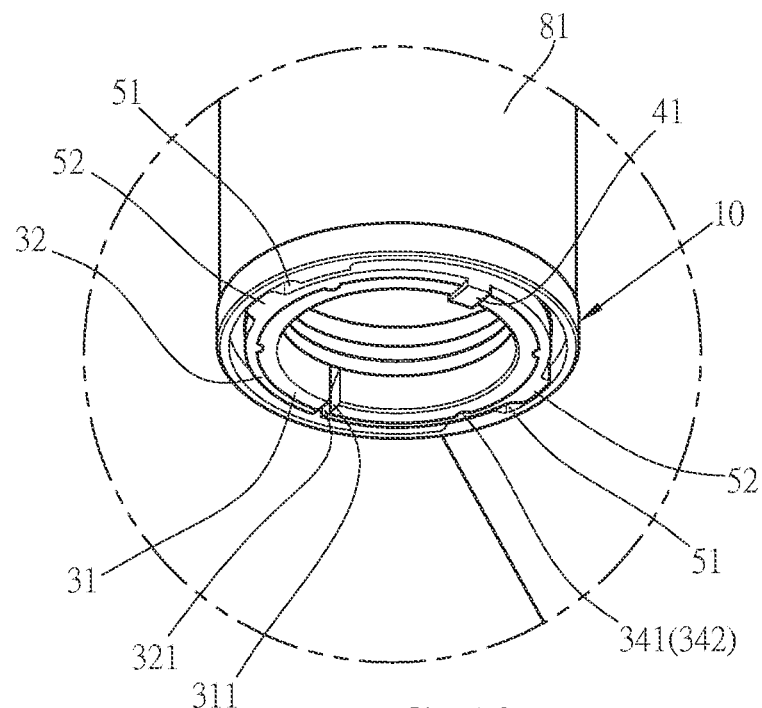
FIG. 12 is an enlarged operational perspective view of the preferred embodiment of the bicycle rotation limiting structure in FIG. 11.
Figure 13:
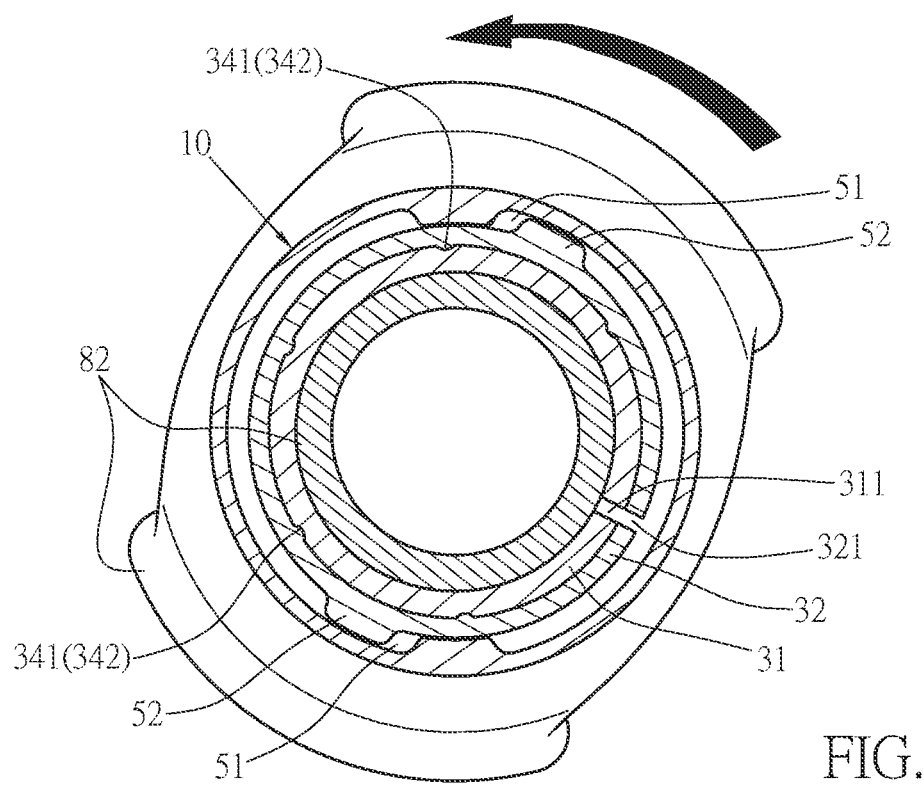
FIG. 13 is an operational cross-sectional bottom view of the preferred embodiment of the bicycle rotation limiting structure in FIG. 11.

With reference to FIG. 8 to FIG. 10, when the handlebar is facing forward during a ride, the limiting tongue 52 is at the middle part of the limiting groove 51. With reference to FIG. 11 to FIG. 13, when the handlebar is turned left during a ride, the lower headset cup 10 and the head tube 81 continue to maintain the same direction, and the fork tube 82, the rotating member 20 and the positioning set 30 synchronously rotate counterclockwisely. At the same time, the limiting tongue 52 also rotate counterclockwisely within the limiting groove 51 until the limiting tongue touches the end of the limiting groove 51 and stop moving.

Figure 14:
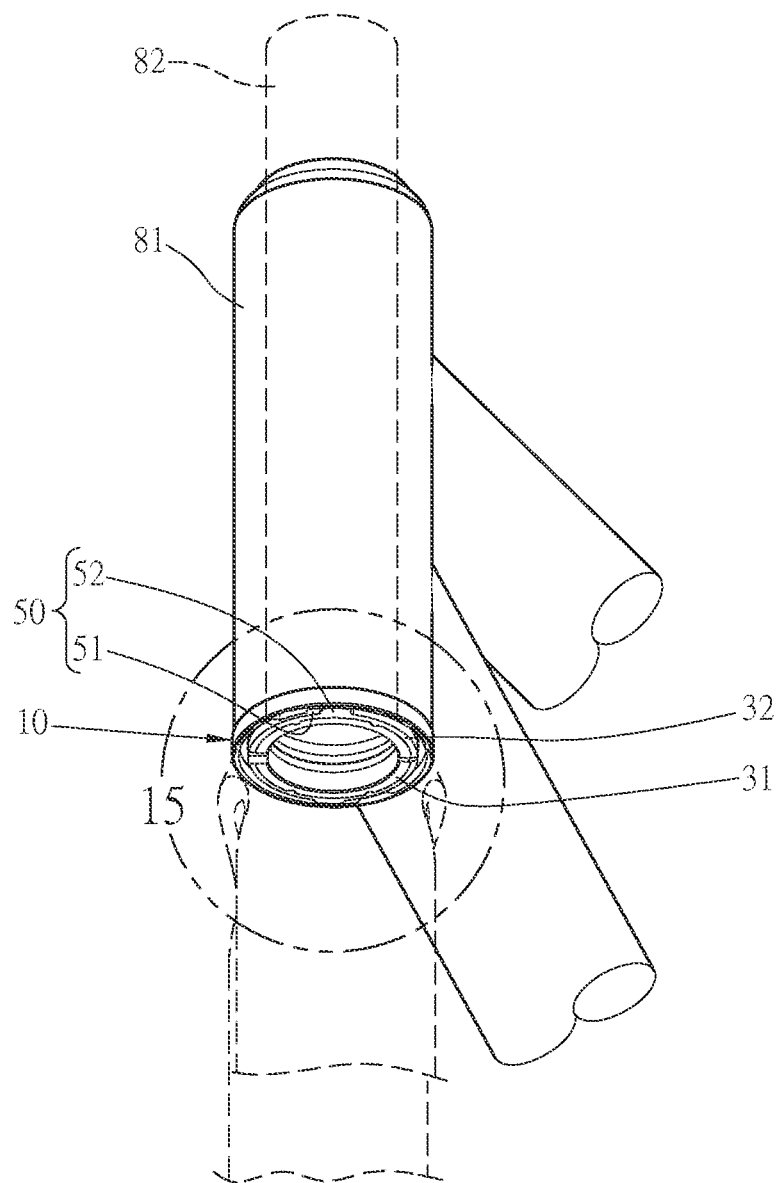
FIG. 14 is a further perspective view of the preferred embodiment of the bicycle rotation limiting structure in FIG. 1 showing the handlebar being turned right.
Figure 15:
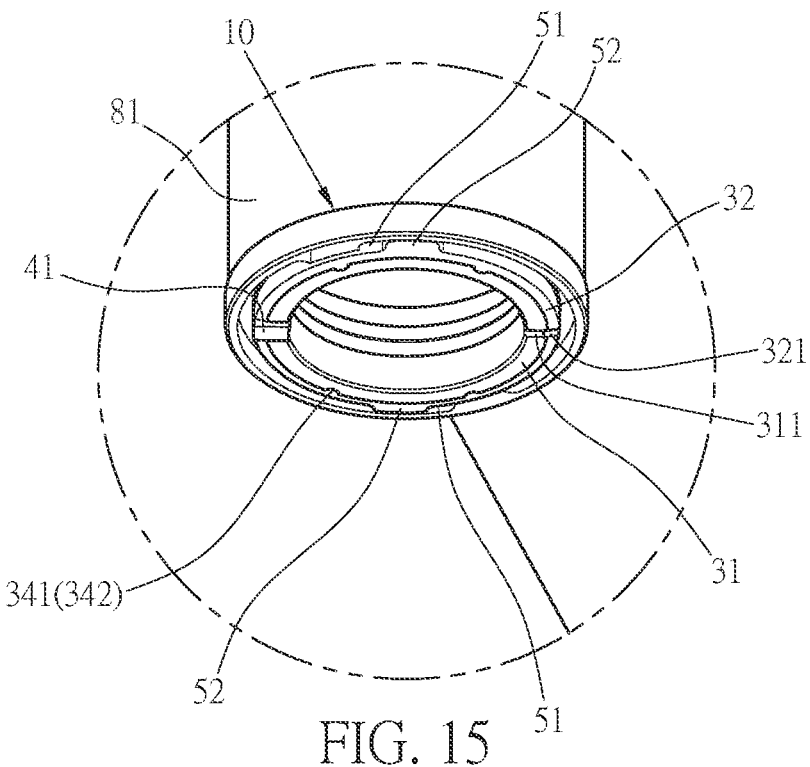
FIG. 15 is an enlarged operational perspective view of the preferred embodiment of the bicycle rotation limiting structure in FIG. 14.
Figure 16:
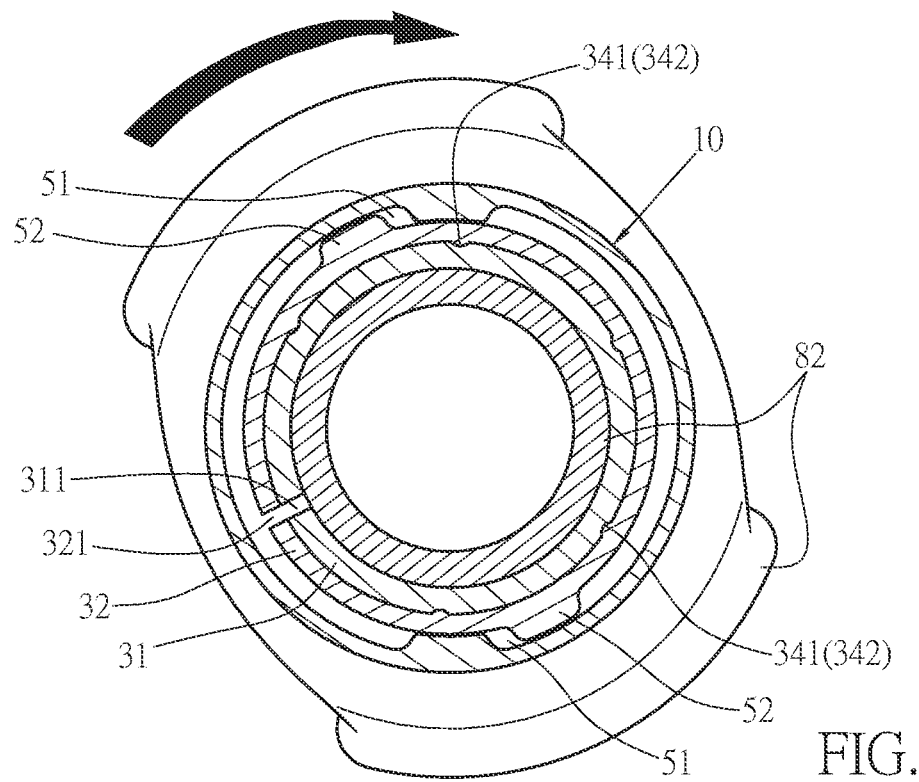
FIG. 16 is an enlarged cross-sectional bottom view of the preferred embodiment of the bicycle rotation limiting structure in FIG. 14.

With reference to FIG. 14 to FIG. 16, when the handlebar is turned right during a ride, the lower headset cup 10 and the head tube 81 continue to maintain the same direction, and the fork tube 82, the rotating member 20 and the positioning set 30 synchronously rotate clockwisely. At the same time, the limiting tongue 52 also rotate clockwisely within the limiting groove 51 until the limiting tongue 52 touches the end of the limiting groove 51 and stop moving.

Since the limiting set 50 is located inside the lower headset cup 10, when the limiting tongue 52 touches the end of the limiting groove 51, a restraining force is generated and transmitted to the middle part of the fork tube 82, limiting further rotation of the fork tube 82, the rotating member 20, and the positioning set 30. The lower headset cup 10 is located around the middle part of the fork tube 82 (close to the base 823 of the fork tube 82), and thus the restraining force is transmitted synchronously to the handlebar and the front wheel, and the rider feels the restraint and cannot continue to rotate the handlebar.

When changing direction of the handlebar, the rider turns the handlebar and drives the fork tube 82, the rotating member 20, and the positioning set 30 to rotate synchronously. Therefore, the driving force of rotation comes from the connection part of the upper fork tube 82 and the handlebar. Then, the driving force is transmitted from the upper part of the fork tube 82 to the rotating member 20 and the positioning set 30. The joining set 40 increases the transmission area of the driving force. At the same time, the first joining member 41 and the second joining member 42 attach mutually to make the connection of the fork tube 82 and the positioning set 30 stable and to increase the synchronicity of the rotation. Furthermore, the joining set 40 is located between the positioning set 30 and the base 823 to add an additional driving force from the middle part of the fork tube 82 and transmitted to the upper part and lower part of the fork tube 82 so as to improve the maneuverability of the rider.

The inner split 311 and the outer split 321 provide elasticity and flexibility for the inner seat 31 and outer seat 32 to adapt different precisions and sizes of related components of a bicycle. The inner seat 31 and the outer seat 32 can be installed easily and grip the fork tube 82 tightly due to the elasticity. The inner seat 31 and the outer seat 32 can be coupled with aligning the inner split 311 with the outer split 321 or without aligning the inner split 311 with the outer split 321.

The first joining member 41 can be integrally formed on the outer seat 32, and the second joining member 42 can be integrally formed on the fork tube 82. Therefore, the fork tube 82 and the second joining member 42 are made of a same first material with identical hardness. The outer seat 32 and the first joining member 41 are also made of a same second material with identical hardness.

Figure 17:
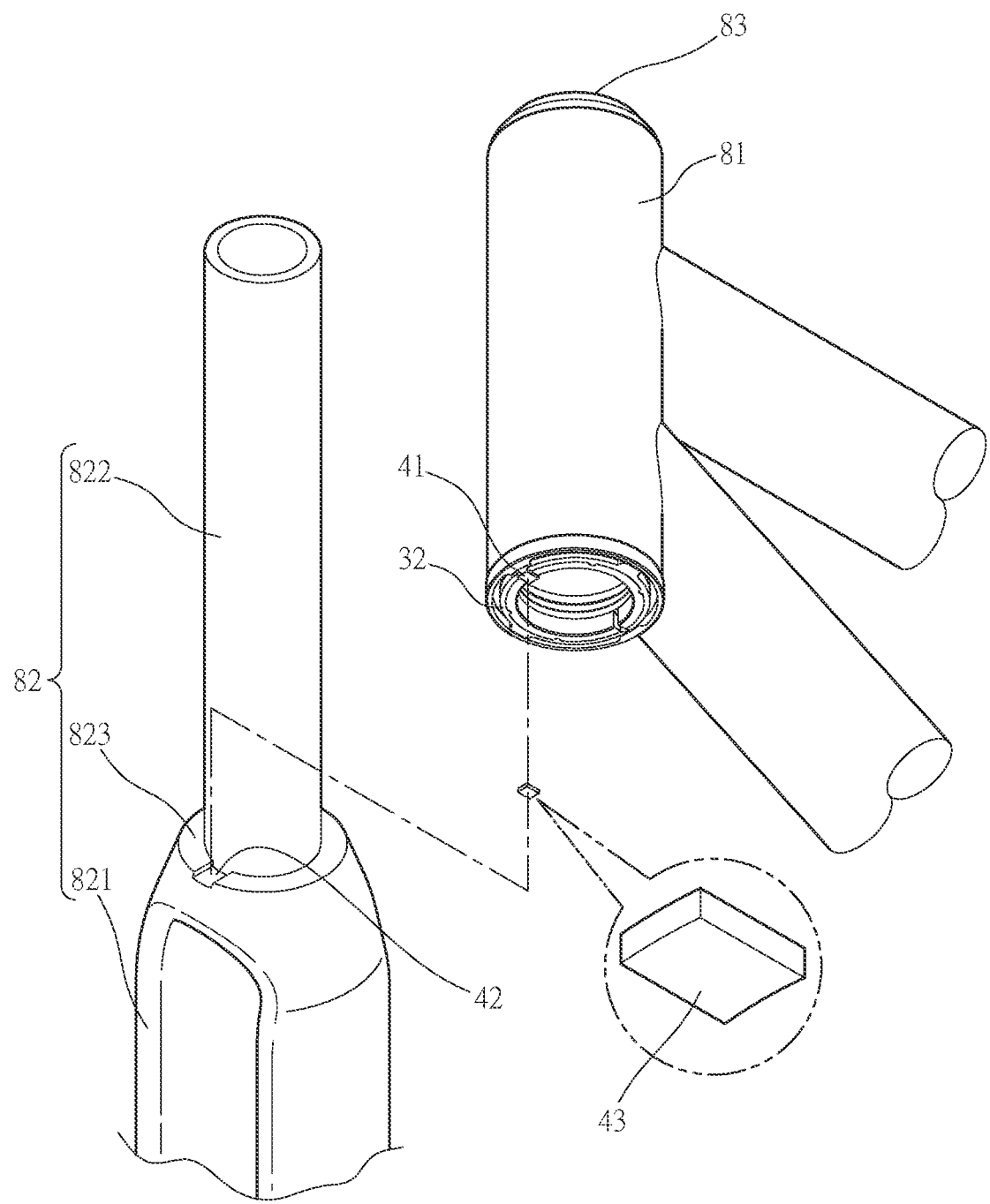
FIG. 17 is an exploded perspective view of a second preferred embodiment of the bicycle rotation limiting structure in accordance with the present invention.
Figure 18:
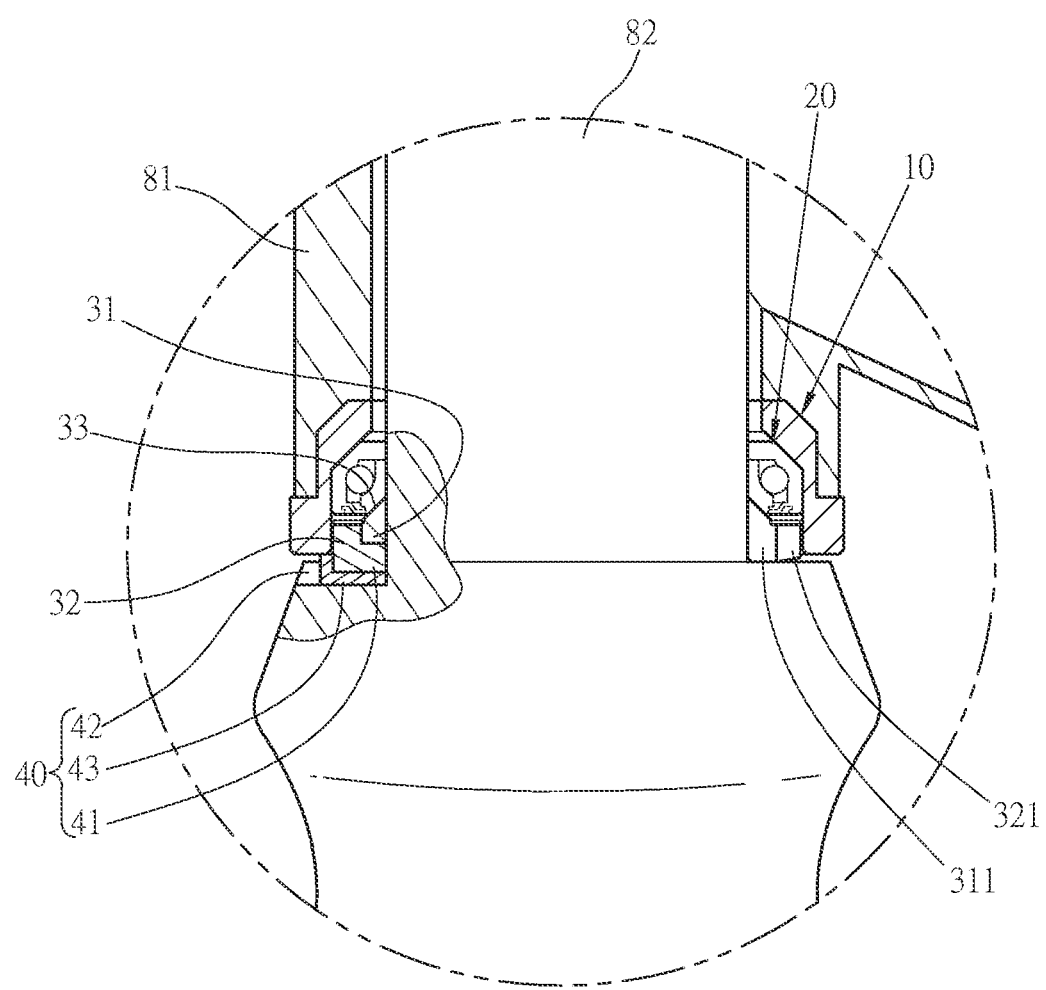
FIG. 18 is an enlarged side view in partial section of the preferred embodiment of the bicycle rotation limiting structure in FIG. 17.

With reference to FIG. 17 and FIG. 18, in a second preferred embodiment, the joining set 40 further comprises a protective component 43 placed between the first joining member 41 and the second joining member 42. The protective component 43 fully covers the first joining member 41 or fully covers the second joining member 42. The hardness of the protective component 43 may be same as the hardness of the first joining member 41 or the second joining member 42. The hardness of the protective component 43 may also be different from the hardness of the first joining member 41 or the second joining member 42.

If the hardness of the protective component 43 is lower than the hardness of the first joining member 41 and the second joining member 42, the protective component 43 effectively reduces the wear and tear of the first joining member 41 and the second joining member 42.

Figure 19:
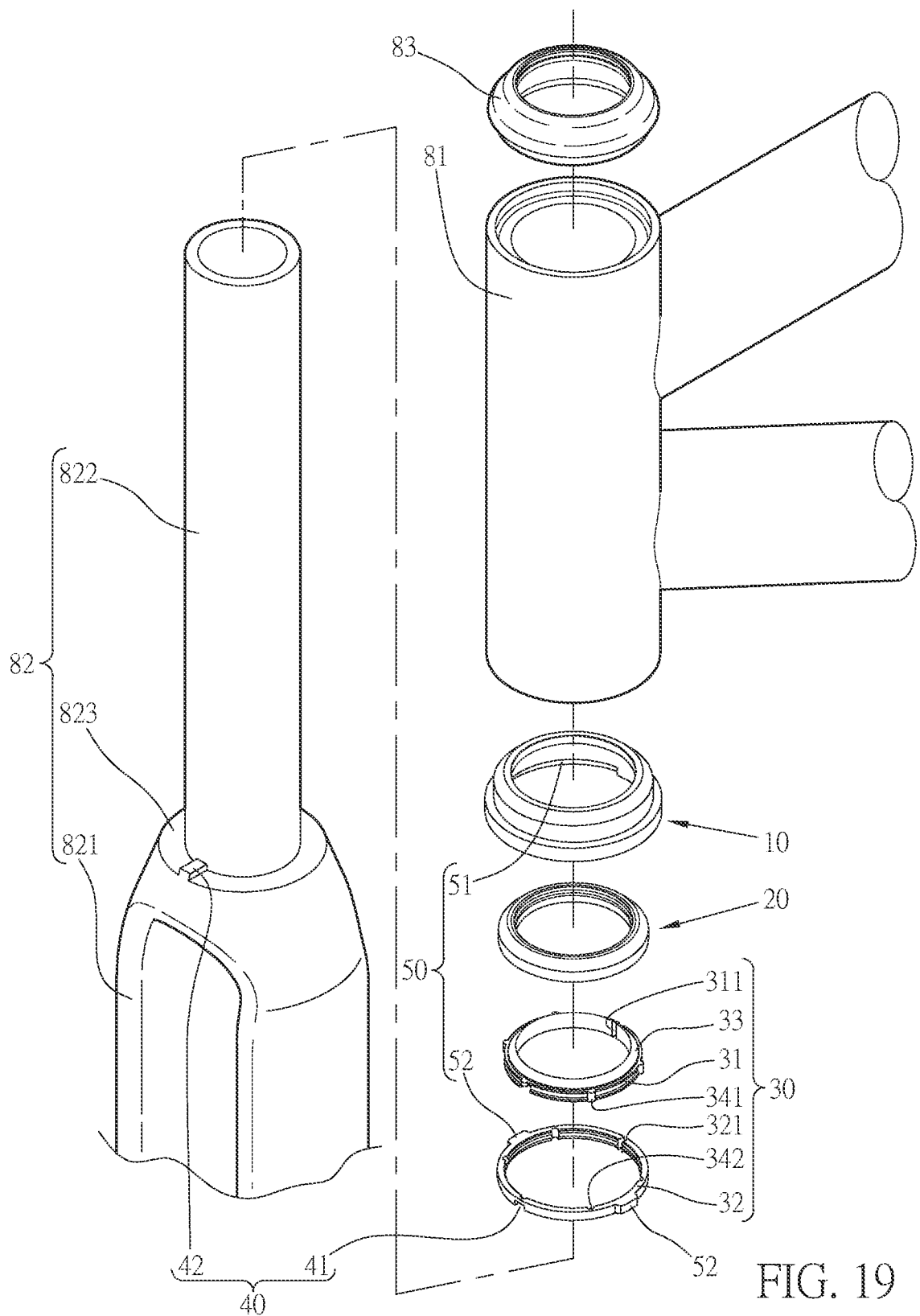
FIG. 19 is an exploded perspective view of a third preferred embodiment of the bicycle rotation limiting structure in accordance with the present invention.

With reference to FIG. 19, in a third preferred embodiment, the first joining member 41 is an indentation located on the outer seat 32, and the second joining member 42 is a raised area located on the base 823 of the fork tube 82 and corresponds to the first joining member 41. In addition, at least one snap-fit pair 34 is formed on the inner seat 31 and the outer seat 32. The snap-fit pair 34 comprises a protrusion 341 on the outer rim of the inner seat 31 and a slot 342 corresponds to the protrusion 341 on the inner rim of the outer seat 32.

Figure 20:
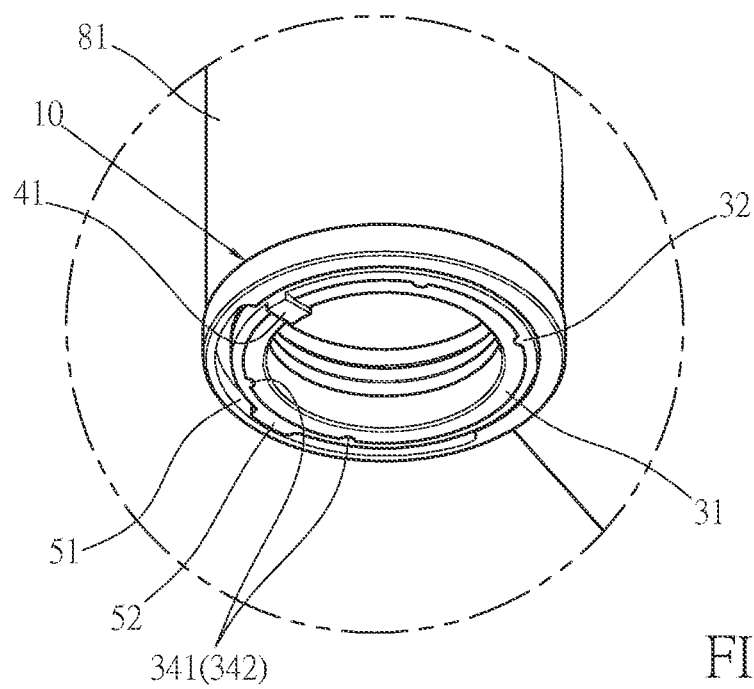
FIG. 20 is an enlarged perspective view of a fourth preferred embodiment of the bicycle rotation limiting structure in accordance with the present invention.
Figure 21:
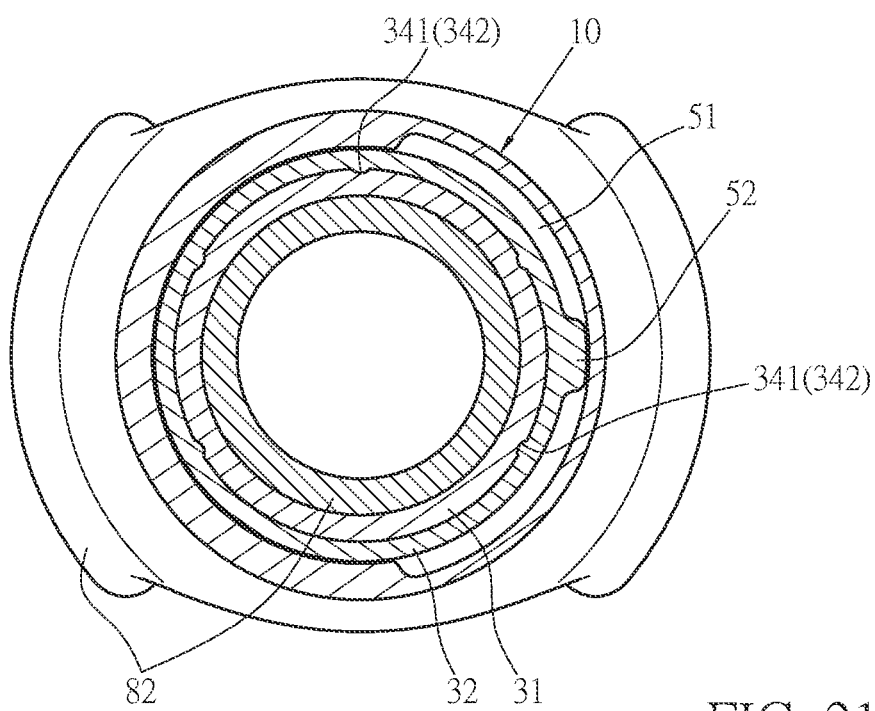
FIG. 21 is a cross-sectional bottom view of the preferred embodiment of the bicycle rotation limiting structure in FIG. 20.

With reference to FIG. 20 and FIG. 21, in a fourth preferred embodiment, a limiting set 50 is located between the lower headset cup 10 and the outer seat 32. The limiting set 50 comprises a limiting groove 51, wherein the limiting groove 51 is a trench defined in the inner rim of the lower headset cup 10. The limiting set 50 also comprises a limiting tongue 52, wherein the limiting tongue 52 is a protrusion formed on the outer rim of the outer seat 32 and the limiting tongue 52 is confined to rotate within the range of the limiting groove 51. The limiting set 50 can effectively limit the rotation range of the synchronous rotation of the fork tube 82, the positioning set 30, and the rotating member 20 whether the rotation is clockwise or counterclockwise.

The limiting set 50 of this embodiment is placed in the lower headset cup 10 near the middle part of the fork tube 82 to make the force of restraint come from the middle part of the fork tube 82, and the forces are transmitted to the two ends of the fork tube 82 to shorten the transmission time and to improve the maneuverability of rotation.

In conclusion, the bicycle rotation limiting structure of this invention can effectively reduce the transmission time of forces, improve the maneuverability and stability of a bicycle, and also reduce the wear and tear of bearings and thus enhance the safety of the bicycle. The joining set located between the positioning set and the middle part of the fork tube along with the limiting set located in the lower headset cup around the middle part of the fork tube make the force of restraint and the synchronous rotation force come from the middle-part of the fork tube to improve the riding experience and safety of a bicycle.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A bicycle rotation limiting structure, comprising a lower headset cup, a rotating member, and a positioning set, wherein, the rotating member comprises an inner surface and an outer surface, wherein the outer surface rotates freely upon the inner surface;

the positioning set comprises:
an inner seat and an outer seat, wherein the inner seat and the outer seat are ring-shaped and coupled together, wherein a contact surface is defined at one side of the inner seat and the contact surface is in contact with the inner surface of the rotating member, and the outer seat is attached to the lower headset cup;
at least one first joining member formed at a rim of the positioning set, the first joining member is a raised area or an indention facing downward; and
a limiting set placed between the lower headset cup and the outer seat, wherein the limiting set comprises a limiting groove and a limiting tongue, wherein,
the limiting groove is a trench defined in an inner rim of the lower headset cup; and
the limiting tongue is a protrusion formed on an outer rim of the outer seat, and the limiting tongue is confined to rotate within the range of the limiting groove; and the lower headset cup is attached to the inner surface and the positioning set is attached to outer surface, wherein the lower headset cup can rotate relatively to the positioning set, and the lower headset cup overlaps partially with the positioning set and forms an overlapping part, wherein a limiting groove and a limiting tongue are formed at the overlapping part, and the limiting tongue can move within the limiting groove.

2. The bicycle rotation limiting structure of claim 1, wherein the first joining member further comprises a protective component, and the protective component is placed under the first joining member and fully covers the first joining member.

3. The bicycle rotation limiting structure of claim 1, wherein at least one snap-fit pair is formed between the inner seat and the outer seat, wherein each one of the at least one snap-fit pair is a pair of interlocking components that locks the inner seat and outer seat and makes the inner seat and the outer seat rotate synchronously.

4. The bicycle rotation limiting structure of claim 3, wherein the snap-fit pair comprises a protrusion formed on the outer rim of an inner seat and a slot corresponds to the protrusion in position and defined in an inner rim of the outer seat.

5. The bicycle rotation limiting structure of claim 3, wherein each one of the at least one snap-fit pair comprises a slot defined in an outer rim of the inner seat and a protrusion corresponds to the slot in position and formed on an inner rim of the outer seat.

6. The bicycle rotation limiting structure of claim 1, wherein an inner split is formed in the inner seat and an outer split is formed in the outer seat.

7. A bicycle rotation limiting structure, comprising a lower headset, a head tube, and a fork tube, wherein the lower headset is placed at the lower part of the head tube, and the fork tube is mounted through the lower headset and the head tube, wherein the lower headset comprises:
a lower headset cup placed inside the inner wall of the lower part of the head tube;
a rotating member placed inside the lower headset cup and mounted around the fork tube,
wherein the rotating member and the fork tube can rotate synchronously and smoothly inside the head tube;

a positioning set placed in the lower headset cup and mounted around the fork tube, wherein the positioning set confines the rotating member to rotate inside the lower headset cup and the positioning set comprises an inner seat and an outer seat, wherein the inner seat and the outer seat are ring-shaped and coupled together, and a contact surface is defined at one side of the inner seat and the contact surface is in contact with the inner surface of the rotating member, and the outer seat is attached to the lower headset cup;

at least one joining set located between the fork tube and the positioning set, wherein the joining set anchors the fork tube and the positioning set to rotate synchronously; and a limiting set placed between the lower headset cup and the outer seat, wherein the limiting set comprises a limiting groove and a limiting tongue, wherein,
the limiting groove is a trench formed in an inner rim of the lower headset cup;
the limiting tongue is a protrusion formed on an outer rim of the outer seat, and the limiting tongue is confined to rotate within the range of the limiting groove; and
the limiting set limits the rotation range of the fork tube, the positioning set, and the rotating member.

8. The bicycle rotation limiting structure of claim 7, wherein,
the joining set comprises a first joining member, wherein the first joining member is a raised area formed at the rim of the positioning set; and
the fork tube comprises a second joining member, wherein the second joining member is an indentation corresponds to the first joining member.

9. The bicycle rotation limiting structure of claim 8, wherein,
the fork tube comprises a fork crown, a steering tube extending through the center part of the fork crown, and a base on the junction of the fork crown and the steering tube; and
the second joining member is formed on the base and is aligned with the direction of the fork tube.

10. The bicycle rotation limiting structure of claim 8, wherein the first joining member and the second joining member are integrally formed with the outer seat and the fork tube respectively.

11. The bicycle rotation limiting structure of claim 7, wherein,
the joining set comprises a first joining member, wherein the first joining member is an indentation formed at the rim of the positioning set; and
the fork tube comprises a second joining member, wherein the second joining member is a raised area corresponds to the first joining member.

12. The bicycle rotation limiting structure of claim 11, wherein the first joining member and the second joining member are integrally formed with the outer seat and the fork tube respectively.

13. The bicycle rotation limiting structure of claim 7, wherein,
the fork tube comprises a fork crown, a steering tube extending through the center part of the fork crown, and a base formed on the junction of the fork crown and the steering tube; and
the second joining member is formed on the base and is aligned with the direction of the fork tube.

14. The bicycle rotation limiting structure of claim 13, wherein the first joining member and the second joining member are integrally formed with the outer seat and the fork tube respectively.

15. The bicycle rotation limiting structure of claim 13, wherein the first joining member further comprises a protective component, and the protective component is placed between the first joining member and the second joining member and fully covers the first joining member.

16. The bicycle rotation limiting structure of claim 7, wherein at least one snap-fit pair is formed between the inner seat and the outer seat, wherein each one of the at least one snap-fit pair is a pair of interlocking components that locks the inner seat and outer seat and makes the inner seat and the outer seat rotate synchronously.

17. The bicycle rotation limiting structure of claim 16, wherein each one of the at least one snap-fit pair comprises a protrusion formed on an outer rim of the inner seat and a slot corresponds to the protrusion in position and formed on an inner rim of the outer seat.

18. The bicycle rotation limiting structure of claim 16, wherein each one of the at least one snap-fit pair comprises a slot defined in an outer rim of the inner seat and a protrusion corresponds to the slot in position and formed on an inner rim of the outer seat.

19. The bicycle rotation limiting structure of claim 7, wherein an inner split is formed in the inner seat and an outer split is formed in the outer seat.

\* \* \* \* \*